Nov. 29, 1966   C. S. WHITE ETAL   3,288,485
KINGPIN AND ASSEMBLY
Filed June 19, 1963   4 Sheets-Sheet 1
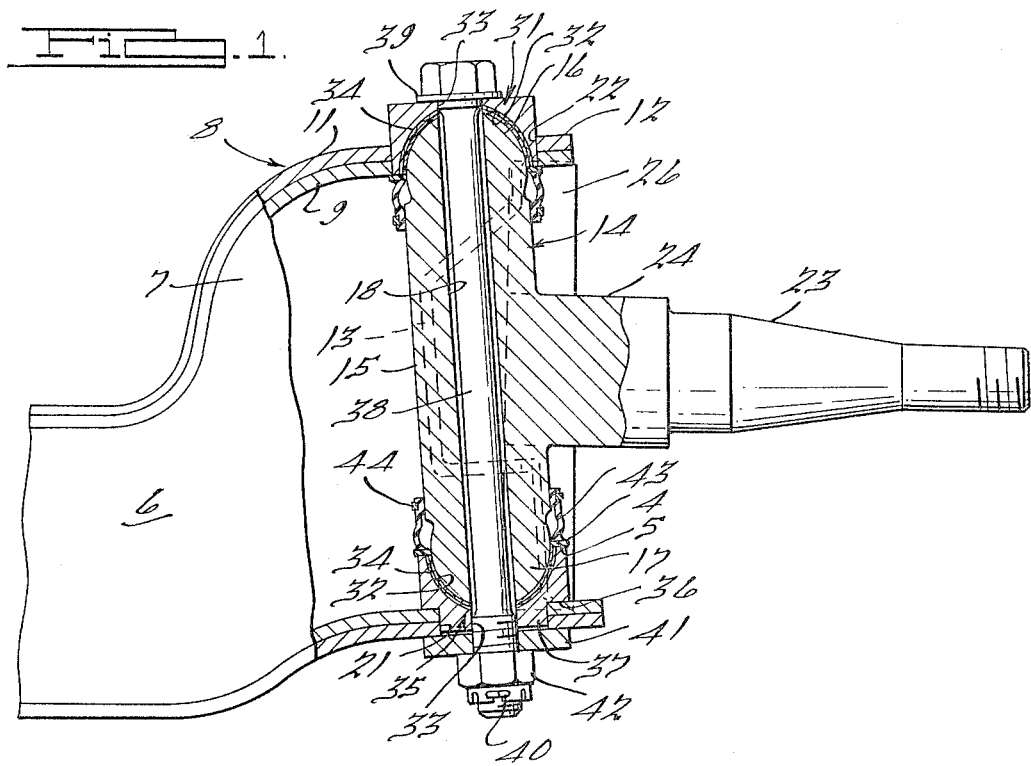
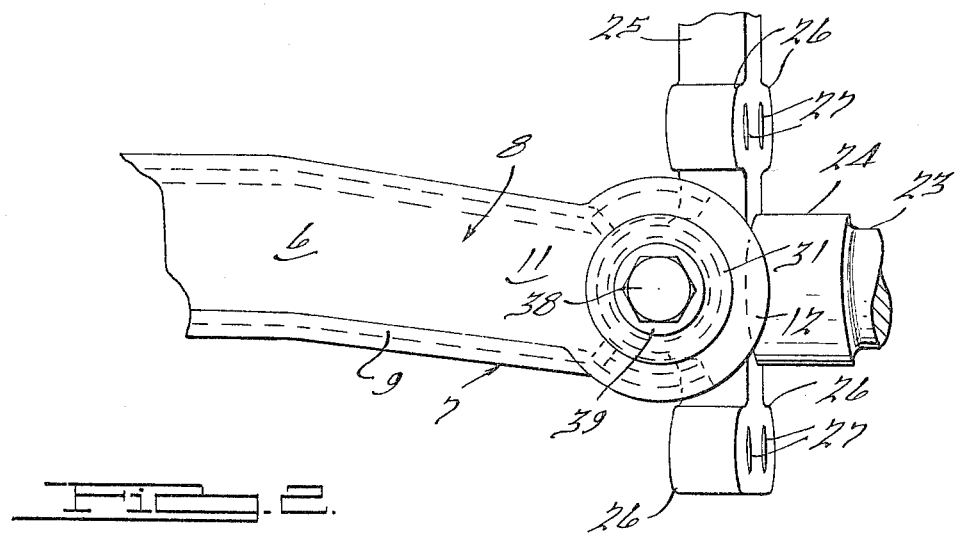
INVENTORS,
Charles S. White
Bernard E. O'Connor.
BY
Harness, Dickey & Pierce.
ATTORNEYS.

Nov. 29, 1966  C. S. WHITE ETAL  3,288,485
KINGPIN AND ASSEMBLY
Filed June 19, 1963  4 Sheets-Sheet 2
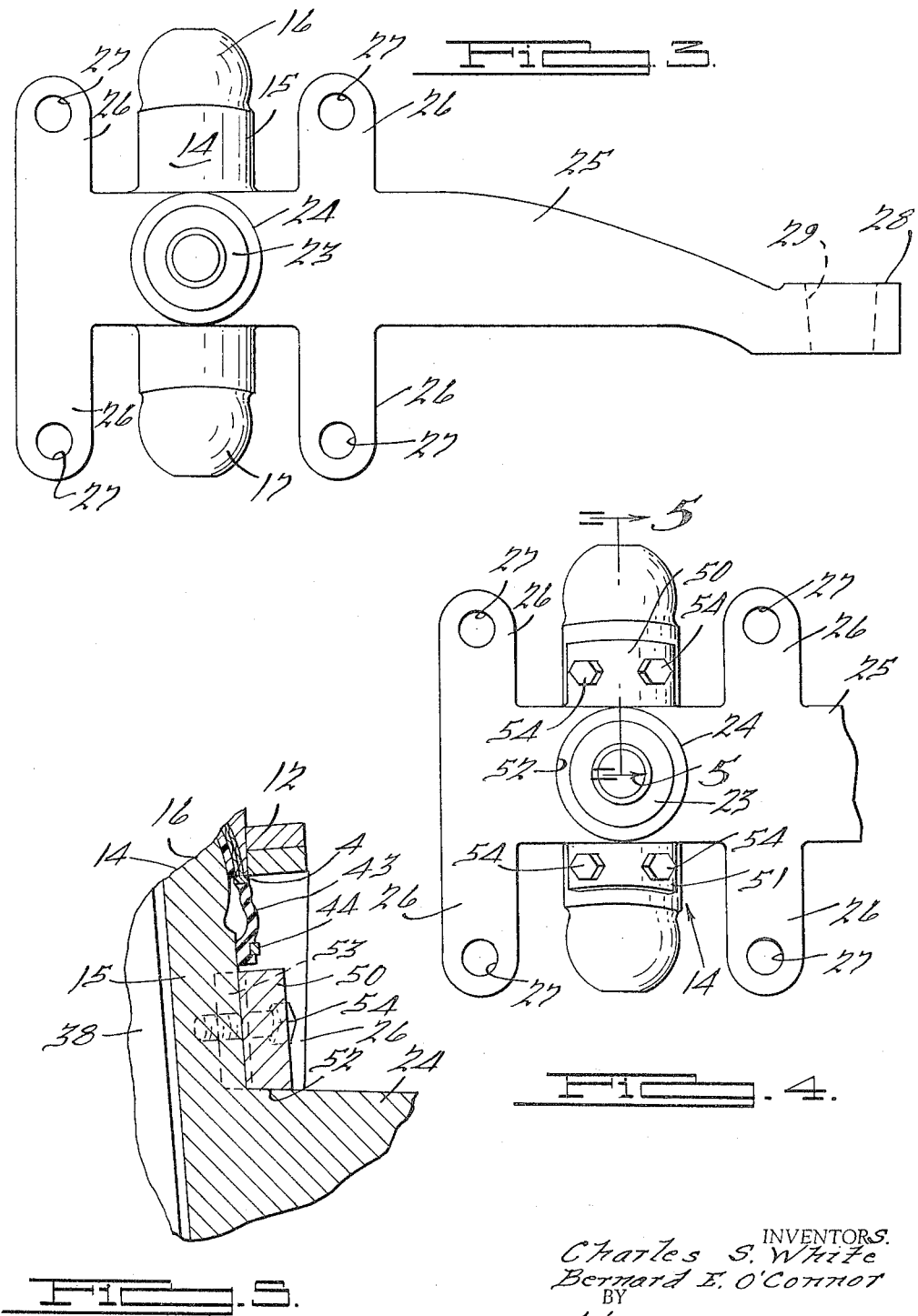
INVENTORS.
Charles S. White
Bernard E. O'Connor
BY
Varness, Dickey & Pierce,
ATTORNEYS

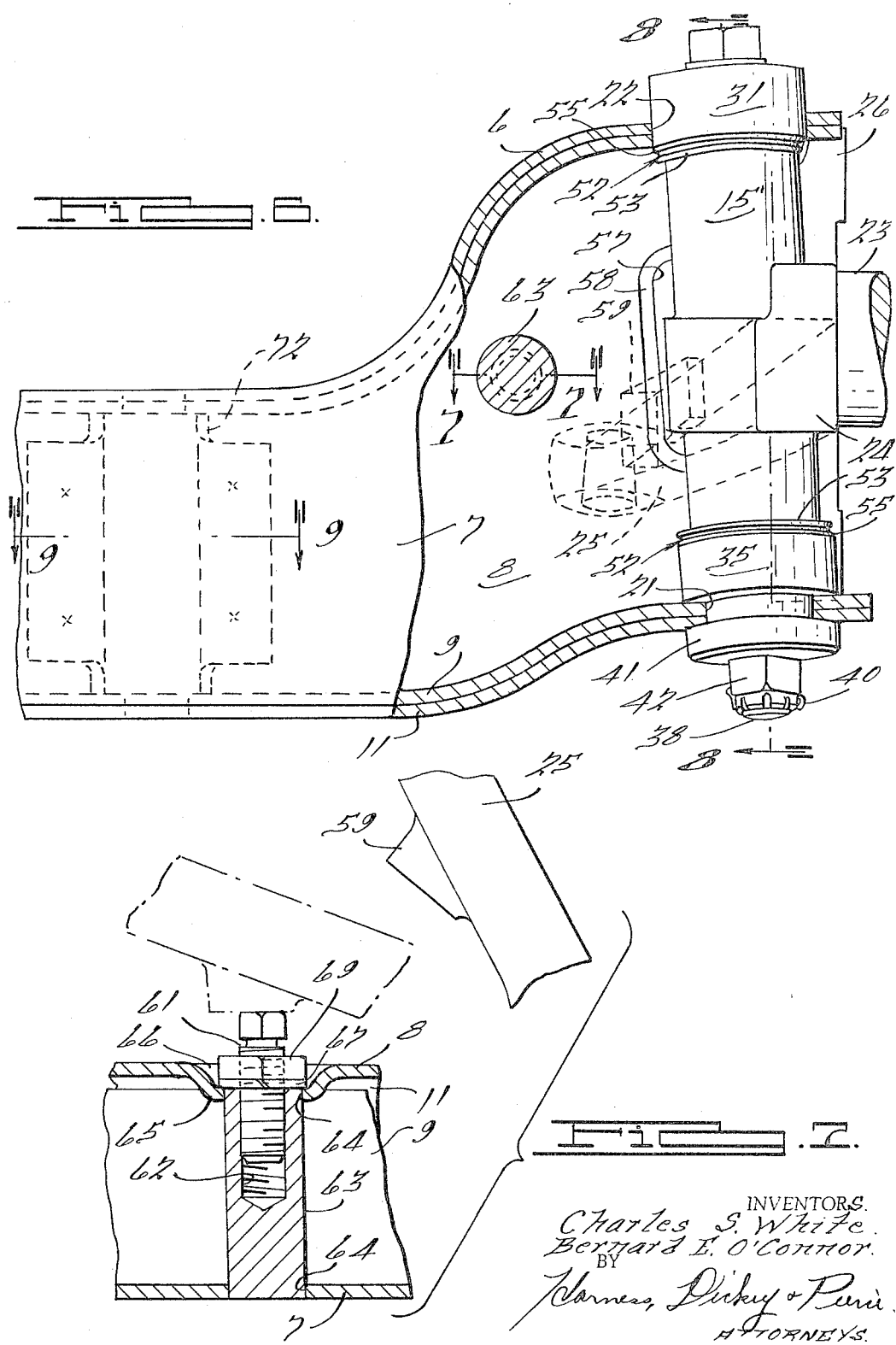

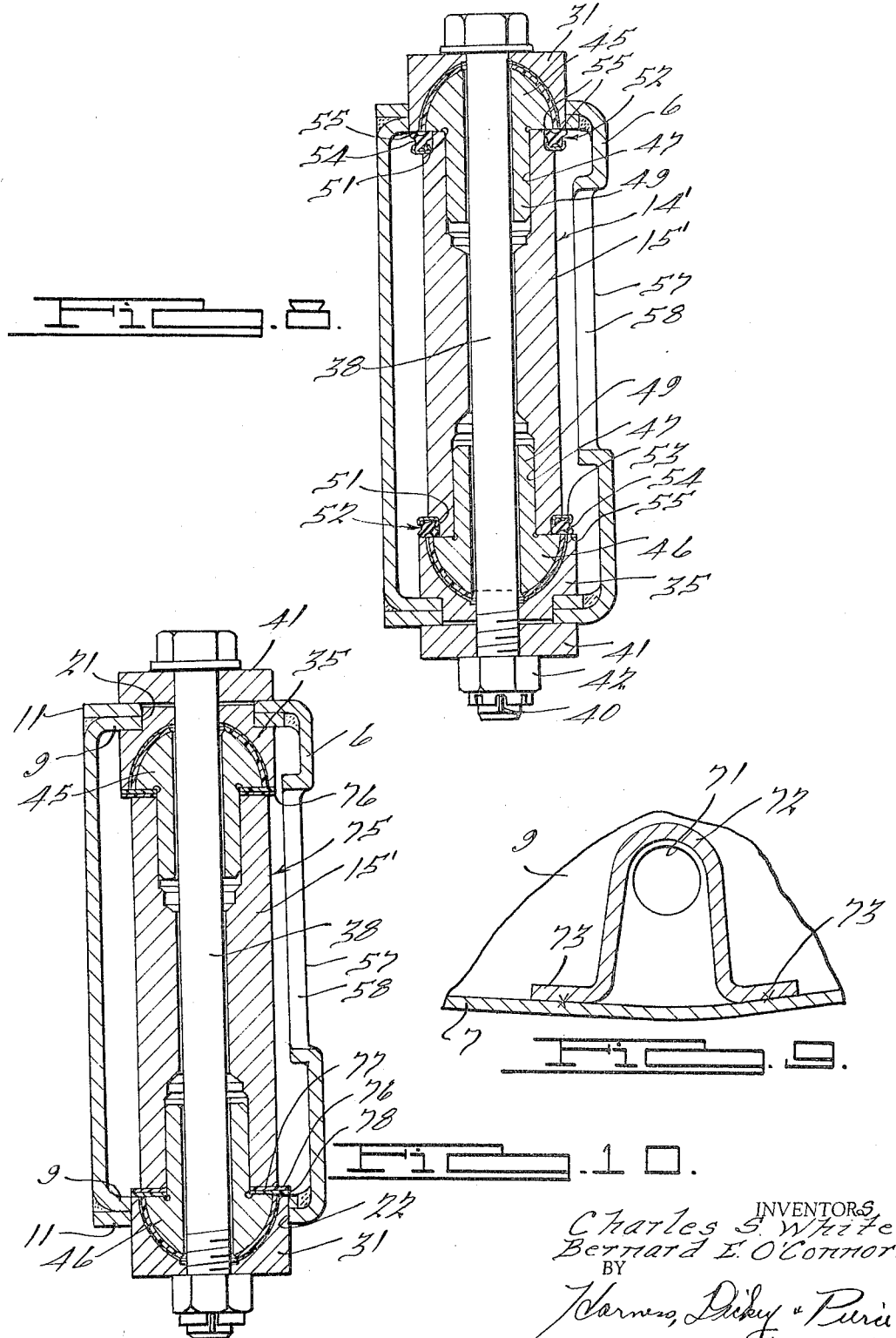

United States Patent Office 3,288,485
Patented Nov. 29, 1966

3,288,485
KINGPIN AND ASSEMBLY
Charles S. White, Rte. 3, Box 454H, Palmdale, Calif., and Bernard E. O'Connor, 8904 Rindge Ave., Playa Del Rey, Calif.
Filed June 19, 1963, Ser. No. 289,132
22 Claims. (Cl. 280—96.1)

This invention relates to kingpins for supporting steerable wheels and particularly to a kingpin of the ball and socket type which supports the load and substantially improves the steering mechanism.

The kingpin of the present invention has a cylindrical body from which a lateral boss projects having a spindle in extension thereof for supporting the wheel for rotation thereon. The ends of the spindle are of truncated spherical shape having a central aperture therethrough and through the body of the spindle. Encompassing sockets for the ball ends have central apertures and a hemispherical inner surface scribed on a radius greater than the radius of the ball ends. This provides clearance for a low friction insert of hemispherical shape with a central opening which is adhered to the recess of the sockets and disposed with the low friction inner face in engagement with the polished surface of the ball ends which rotates thereon. The sockets and kingpins are assembled in a box section end of a stamped member which forms the chassis frame, the end of an A frame or the end of a bolster which is pivoted on the opposite rail of a frame from that adjacent to the box section end.

The box section end has aligned top and bottom apertures the axis through the centers of which is tilted inwardly from a vertical plane. The apertures are spaced apart sufficiently to permit the kingpin to be moved into the upper aperture and swung inwardly at the bottom into alignment with the bottom socket which has a shoulder end that extends in the bottom aperture. The top socket is then press fitted into the top aperture and a bolt is passed therethrough, through the aperture in the kingpin and that in the bottom socket, through a washer below the bottom surface of the box section end, all of which is clamped together by a nut on the bolt. The body of the bolt is relieved so as to be out of engagement with the inner surface of the aperture through the kingpin to prevent frictional engagement therebetween. The forging forming the kingpin and spindle also has four extending arms with apertures to which a brake pad is bolted. From the supporting position of the arms an extending arm is provided having a boss containing an aperture for connection to a stud of a joint of the steering mechanism.

The low friction face of the inserts which are adhered to the sockets is preferably made from Teflon filaments in cloth-like form or in a matrix of a resin material which produces a low friction face which will plasticize under load and movement to further lower the coefficient of friction between the engaged surfaces. The insert is formed to have an inner diameter equal to that of the ball and an outer diameter equal to that of the recess in the sockets so as to produce a pressure surface engagement with the ball ends outwardly from the end aperture to the edge of the sockets. The ball and socket ends of the kingpin substantially reduce wheel fight, vibration and steering effort.

An elastomeric seal of sleeve form is secured by a band to the body of the kingpin at each end with the extending unsecured end of the seal in abutting engagement with the finished surface of the sockets to protect the surface of the ball and the resin material of the insert. It is within the purview of the invention to have the extending arms of the unit provided as a separate forging which is bolted or otherwise secured to the kingpin forging to simplify the manufacture and the machining thereof.

The ball ends may be made separate from the body of the kingpin so that they may be manufactured from different materials from that of the body and may be cold-headed or finished to spherical form with a high polish prior to or after being assembled in apertures in the ends of the body portion, preferably by being press fitted therein. When separately constructing the ball ends, a disc seal, an O-ring or other type of seal may be mounted between the ball ends and the body upon the assembly thereof for positively sealing the engaged ball and the socket surfaces from the entrance of moisture, dust and grime. The large opening for the socket may be provided in the bottom of the supporting element and the small opening at the top so that the shouldered socket will be in the top to have the load supported on the top flanges of the supporting element and to provide a "fail-safe" feature should the bolt break or the nut separate therefrom.

Accordingly, the main objects of the invention are: to provide a kingpin and mount therefor having ball ends and sockets which are secured together and to a support by a through bolt and washer; to provide a kingpin having a low friction ball and socket support at the top which takes the load through a ball and socket at the bottom from the bottom of the supporting members; to provide a steering arm with brake pad supporting arms which is a permanent or a removable part of a kingpin which supports the load from the top when attached at the bottom of a supporting element, and in general, to provide a kingpin which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

FIGURE 1 is a broken sectional view of a supporting element having a kingpin of the present invention therein;

FIG. 2 is a broken plan view of the structure illustrated in FIG. 1;

FIG. 3 is an end view of the kingpin illustrated in FIG. 1 taken from the right hand end thereof;

FIG. 4 is a broken view of structure, similar to that illustrated in FIG. 3, showing another form thereof;

FIG. 5 is a broken view of structure, similar to that illustrated in FIG. 1 with the structure of FIG. 4 employed thereon;

FIG. 6 is a view of a structure similar to that illustrated in FIG. 1, with parts broken away;

FIG. 7 is a broken sectional view of the structure illustrated in FIG. 6, taken on the line 7—7 thereof;

FIG. 8 is a sectional view of the structure illustrated in FIG. 6, taken on the line 8—8 thereof;

FIG. 9 is a sectional view of the structure illustrated in FIG. 6, taken on the line 9—9 thereof; and FIG. 10 is a view of structure, similar to that illustrated in FIG. 8, showing another form which the invention may assume.

The supporting frame, arm or bolster 6 is of box section construction formed of two channel elements 7 and 8, with the flanges 9 of the element 7 telescoped within the flanges 11 of the element 8. A cylindrical box section end 12 is cut away along the line 13 to provide clearance for the elements of the kingpin 14 when moved angularly. The kingpin has a cylindrical body 15 with a top ball end 16 and a bottom ball end 17. A central aperture 18 passes through the body 15 and the two ball ends 16 and 17. An aperture 21 is provided through the bottom flanges 9 and 11 and a larger aperture 22 is provided through the top flanges 9 and 11 of the box section end element. A line through the center of the apertures tilts away from the vertical at the top to provide the proper tilt to the kingpin. A wheel is supported on a spindle 23 which extends from a hub 24 on the body 15 of the kingpin. The centerline of the hub and spindle tilt downwardly from the axis of the kingpin so as to be substantially horizontal.

The single forging of the kingpin and spindle may also include a steering arm 25 from which brake-pad supporting arms 26 extend and are provided with apertures 27 by which the pad is bolted thereto. The end of the steering arm 25 has a boss 28 containing an aperture 29 by which a ball stud or other element is secured to a link of the steering mechanism in a conventional manner.

A socket 31 has a hemispherical recess 32 struck from a greater radius than that of the ball end 16 and a central aperture 33 which is aligned with the aperture 18 of the kingpin. An insert 34 having a face of low friction material is secured to the surface of hemispherical recess of the socket 31 with a central opening therethrough aligned with the opening 33 in the socket for engaging the finished surface of the ball end 16 at the top end of the kingpin, which may be honed, cold worked or otherwise formed. A bottom socket 35 is similar to the socket 31 except for having a shoulder 36 which reduces the diameter of the end 37 that extends within the aperture 21 short of the outer surface of the flange 11.

A bolt 38 has a washer 39 thereon adjacent to the head with a body portion having a reduced diameter extending through the aperture 33 of the socket 31, that of the insert 34, through the aperture 18 of the kingpin, the aperture of the insert 34 and the socket 35 and through a washer 41 on the outer surface of the flange 11 which has an overall diameter equal to the socket 35. A nut 42, when threaded on the end of the bolt 38 and secured by a cotter pin 40, clamps the assembly in firm fixed relation together and to the bottom flanges 9 and 11 of the box section end 12 of the frame element 8. The load to be supported by the wheel on the spindle 23 is taken by the upper ball end 16 and socket 31 through the bolt 38 and the bottom flanges 9 and 11 of the box section end. The joints prouced by the balls 16 and 17 on the low friction material, preferably Teflon filaments, requires no lubrication and provides extremely low friction surface engagement and a light steering load.

Seals are provided for protecting the joints, the one herein illustrated embodying a cylindrical sleeve 43 of rubber, neoprene or the like which is secured by a clamping band 44 to the body 15 of the kingpin at each end thereof. An end washer 4 of nylon or the like abuts against the finished face 5 of the sockets 31 and 35 to seal the joint against moisture, dirt and grime.

The inserts are preferably made from discs of cotton cloth which has been impregnated with a resin, such as phenolformaldehyde and the like, which readily bonds thereto and to the cotton or other fibers in the compound cloth woven from the Teflon filament threads and the threads of cotton or other bondable material. The discs with the Teflon filaments on the top face are molded into hemispherical form under heat and pressure in a manner illustrated and described in the patents to C. S. White No. 2,885,248 issued May 5, 1959, for Molded Bearings having low friction mating surfaces, No. 2,835,521 issued May 20, 1958 for Ball Joint Bearing Structure and Re. 24,765, issued January 12, 1960 for Low Friction Fabric Material. The inserts have the aperture cut therein either when in disc form or after the insert had been hemispherically shaped. The discs may be formed directly in the sockets and bonded thereto during the heating and forming operation or performed and subsequently inserted in the sockets. Since the load is not taken directly on the top of the ball end 16 in view of the aperture therethrough, sufficient area engagement will be assured outwardly therefrom to provide adequate support without damaging the Teflon filaments. It is within the purview of the invention to first cure the insert to the "B" stage, which is a stage at which it may be further formed before being cured. After the sockets are assembled with the ball end the assembly may be heated sufficiently to shape the inserts precisely to the ball ends and cure the resin material which bonds the threads together and to the sockets to provide a more accurate surface engagement between the Teflon filaments and the surface of the ball ends.

When mounting the kingpin within the box section end 12 of the member 8, the top ball end 16 with the body is disposed at an angle and inserted into the upper aperture 22 of the top flanges 9 and 11 after the lower socket 34 has been inserted in the aperture 21 in the bottom flanges 9 and 11. After passing into the aperture the body 15 is straightened and the bottom ball end 17 is moved down into the recess in the socket 34. Thereafter the upper socket 34 is press fitted into the wall of the aperture 35 and the bolt is passed through the two sockets 31 and 35, the kingpin 14 and through the washer 41 and are secured together when the nut 42 is screwed upon the threads of the bolt 38. The nut 42 also clamps the lower socket 35 and washer 41 between the lower flanges 9 and 11 of the box section end 12. With this arrangement the weight of the load on the bottom flanges 9 and 11 of the element 6 passes through the bolt to the top socket 31 which takes the load on the top ball end 16 of the kingpin 14. The large area of the ball ends and that of the low friction face of the inserts in the sockets permits ease of turning of the kingpin on the low friction surface of the sockets. Because of the Teflon surface engagement with the surface of the ball excessive vibration and wheel fight is substantially reduced if not eliminated. The end of the wall of the socket 31 may be knurled to provide assurance that it will not turn in the aperture 22 of the top flanges 9 and 11 of the box section end 12.

The same structure is illustrated in FIGS. 4 and 5 with the exception that the kingpin 14 is formed with the hub and spindle 23 only thereon to simplify the forging operation. The arm 25 and the brake pad supporting arms 26 along with extensions 50 and 51 are formed as a second forging with a central aperture 52 which extends over the hub 24 and with an inner arcuate face 53 which engages the cylindrical face of the body 15 of the kingpin. Bolts 54 secure the extensions 50 and 51 to the body 15 of the kingpin in unit relation therewith.

Referring to FIGS. 6 to 9, inclusive, a further form of the invention is illustrated that wherein ball ends 45 and 46 are made separate from the body 15' of the kingpin 14'. Each end of the body 15' has a cylindrical aperture 47 for receiving a cylindrical extension or boss 49 of the ball ends 45 and 46 which is press fitted therein. The use of the separate ball ends simplifies the forging of the body 15' with the steering arm 25 and brake pad supporting arms 26 in extension of the body 15'. This also permits the ball ends 45 and 46 to be made from a different material from that of the forging and the ball portion of the ends to be cold-headed or finished to accurate polished spherical section when separate from the body 15'.

The use of the separate ball ends 45 and 46 simplifies the sealing of the bearing surfaces as is evident from examining the structure of FIG. 8. The ends of the body 15' of the kingpin is recessed to provide a shoulder 51 for receiving an O-ring 52 of rubber, neoprene or the like, which may have an inner supporting collar 53 disposed in engagement with the wall of the recesses 51. The O-ring may have a square section with the sides recessed at 54 to provide extending arms 55, one of which engages the adjacent surface of the sockets 31 and 35 in sealed relation thereto. The O-ring is assembled in the recess 51 before the ball ends 45 and 46 have the extending portions 49 thereof press fitted within the apertures 47. The kingpin is assembled within the sockets 31 and 35 in the manner pointed out hereinabove and secured in position by the bolt 38. As pointed out above, the ball ends 45 and 46 can be cold-headed and the sockets 31 and 35 may also be constructed by a cold-forming operation. A substantially perfect spherical form can be obtained by the cold-forming operation in the recess and on the head with the surface of the head sufficiently smooth to operate successfully upon the inserted surface.

In the construction illustrated, it is contemplated that the kingpin will turn through an angle of substantially 71°; 32° forwardly and 39° rearwardly. The side wall of the member 6 is cut away at 57 to provide clearance for the steering arm 25 with the cutaway portions flanged inwardly at 58 to provide additional strength thereto. To limit the movement to the rear of the steering arm 25, a boss 59 is provided thereon which moves into engagement with the head of a screw 61 which is adjusted within a threaded aperture 62 of a boss 63 which extends through apertures 64 in the web of the channel elements 7 and 8. The boss is welded or otherwise secured in the apertures and the aperture 64 is provided in an offset portion 65 of the web of the channel 8 to provide a recess 66 for the reception of a lock washer 67 and nut 68 which locks the screw 61 in adjusted position. By adjusting the screw 61, the rearward turning of the kingpin is limited when the steering arm 25 strikes the head thereof.

Apertures 71 are provided through the flanges 9 and 11 at the top and bottom and for reinforcing the flanges against being drawn toward each other. A stamping 72 of U-shaped form is disposed in engagement with the flanges 9 with the lateral extending arms 73 of the stamping welded to the inner face of the web of the channel 7, as clearly illustrated in FIG. 9. The composite kingpin illustrated in FIGS. 6 and 9 functions in the same manner as the kingpin of FIGS. 1-5, the separate ball ends substantially simplifying the manufacture and the sealing of the engaged bearing surfaces.

Referring to FIG. 10, a kingpin 75 is illustrated which is the same as that of FIG. 8 with the exception that different seals 76 are employed thereon and the sockets 31 and 35 are reversed when secured in the reversed apertures 21 and 22 of the supporting members. The smaller aperture 21 is provided through the top flanges 9 and 11 while a large aperture 22 is provided through the bottom flanges of the member. The heavy washer 41 rests upon the top flange 11 with the sockets clamped in position by the bolt 38. With this arrangement, should the bolt fail or should the nut 42 work loose on the threads, the socket 35 would be retained within the aperture 21 and the structure would be maintained in assembled relationship. While this arrangement may have a "fail-safe" factor, there is little chance for the bolts to become ruptured or the nut becoming lost and the structure of FIG. 8 is preferred since the load is taken on the bottom flanges of the supporting member 6. The washer assembly 6 has a dished spring metal body 77 with a low friction edge face 78, which may be a Teflon or like low friction material, clamped between the heads 45 and 46 and the body portion 15 at the time of assembly with the low friction edge 78 in position to engage the adjacent surface of the sockets 31 and 35 when the ball ends 45 and 46 are mounted therein to produce a seal for the engaged bearing surfaces.

What is claimed is:

1. A kingpin assembly adapted to be received in a supporting member and having a body, a ball end on the ends of the body, a pair of sockets having a truncated spherical recess for engaging each of the ball ends, said sockets and ball ends having an aperture extending longitudinally therethrough, said sockets being removably receivable in said supporting member, and a bolt for passing through the apertures and clamping the sockets and ball ends together and in said supporting member.

2. A kingpin having a body, a ball end on the ends of the body, a pair of sockets having a truncated spherical recess for engaging each of the ball ends, said sockets and ball ends having an aperture extending longitudinally therethrough, a bolt for passing through the apertures and clamping the sockets and ball ends together, an element having a box section supporting end with a pair of aligned apertures for said sockets which extend therein with one socket having a shoulder preventing it from passing through one of the apertures, and a washer on said bolt on the outside of the box section portion of said element adjacent to the shouldered socket for clamping the socket thereto and supporting the load on the opposite ball end of the kingpin.

3. In a kingpin assembly adapted to be received in a supporting member, a body portion having a through aperture and a spindle extending outwardly from between the ends thereof, ball ends on the ends of the body portion, and a socket for each end of the ball ends having a truncated spherical section for receiving the ball ends, said sockets having an aperture aligned with the aperture through the ball ends and body portion, and said sockets being removably receivable in said supporting member.

4. In a kingpin assembly adapted to be received in a supporting member, a body portion having a through aperture and a spindle extending outwardly from between the ends thereof, ball ends on the ends of the body portion, a socket for each end of the ball ends having a truncated spherical section for receiving the ball ends, said sockets having an aperture aligned with the aperture through the ball ends and body portion, said sockets being removably receivable in said supporting member, and a steering arm extending from said body portion substantially at right angle to said spindle.

5. In a kingpin assembly adapted to be received in a supporting member, a body portion having a through aperture and a spindle extending outwardly from between the ends thereof, ball ends on the ends of the body portion, a socket for each end of the ball ends having a truncated spherical section for receiving the ball ends, said sockets having an aperture aligned with an aperture through the ball ends and body portion and being removably receivable in said supporting member, a steering arm extending from said body portion substantially at right angle to said spindle, and brake-pad supporting means on said body.

6. In a kingpin assembly adapted to be received in a supporting member, a body portion having a through aperture and a spindle outwardly from between the ends thereof, ball ends on the ends of the body portion, a socket for each end of the ball ends having a truncated spherical section for receiving the ball ends, said sockets having an aperture aligned with the aperture through the ball ends and body portion and being removably receivable in said supporting member, a steering arm extending from said body portion substantially at right angle to said spindle, and brake-pad supporting means on said body portion, said steering arm and brake-pad supporting means being a unit removably secured to said body.

7. In a kingpin assembly adapted to be received in a supporting member, a body portion having a through aperture and a spindle extending outwardly from between the ends thereof, ball ends on the ends of the body portion, a socket for each end of the ball ends having a truncated spherical section for receiving the ball ends, said sockets having an aperture aligned with the aperture through the ball ends and body portion and being removably receivable in said supporting member, and inserts secured within said sockets having a low friction face engageable with the surface of said ball ends.

8. In a kingpin assembly adapted to be received in a supporting member, a body portion having a through aperture and a spindle extending outwardly from between the ends thereof, ball ends on the ends of the body portion, a socket for each end of the ball ends having a truncated spherical section for receiving the ball ends, said sockets having an aperture aligned with the aperture through the ball ends and body portion and being removably received in said supporting member, and inserts secured within said sockets having a low friction face engageable with the surface of said ball ends, said low friction face of the inserts being made from Teflon filaments.

9. In a kingpin assembly adapted to be received in a supporting member, a body portion having a through aperture and a spindle extending outwardly from between the ends thereof, ball ends on the ends of the body portion, a socket for each end of the ball ends having a truncated spherical section for receiving the ball ends, said sockets having an aperture aligned with the aperture through the ball ends and body portion and being removably received in said supporting member, and inserts secured within said sockets having a low friction face engageable with the surface of said ball ends, said low friction face of the inserts being made from Teflon filaments, which are interrelated to form a cloth-like material which is secured to the face of the insert.

10. A kingpin having a body, a ball end on the ends of the body, a pair of sockets having a truncated spherical recess for engaging each of the ball ends, said sockets and ball ends having an aperture extending longitudinally therethrough, a bolt for passing through the apertures and clamping the sockets and ball ends together, one of said sockets having a shouldered end, and a washer on said bolt for clamping the shoulder against a support member with said washer on the opposite side thereof.

11. In a kingpin assembly, a body portion having a through aperture and a spindle extending outwardly from between the ends thereof, and separate ball ends removably secured in the ends of the body and constructed independent of the body, and said base ends being nonmovable relative to said body when secured therein.

12. In a kingpin assembly, a body portion having a through aperture and a spindle extending outwardly from between the ends thereof, separate ball ends on the ends of the body constructed independent of the body, the ends of said body having enlarged apertures, and bosses extending from the ball ends and disposed within the apertures.

13. In a kingpin assembly, a body portion having a through aperture and a spindle extending outwardly from between the ends thereof, separate ball ends on the body constructed independent of the body, the ends of said body having enlarged apertures, bosses extending from the ball ends and disposed within the apertures, and said bosses being press fitted into the apertures in fixed relation to the body.

14. In a kingpin, a body portion having a through aperture and a spindle extending outwardly from between the ends thereof, separate ball ends on the ends of the body constructed independent of the body, the ends of said body having enlarged apertures, bosses extending from the ball ends and disposed within the apertures, and sealing means disposed between the ball ends and the body extending outwardly thereof beyond the ball surface.

15. In a bearing construction, a body having an aperture therein, a ball study having a semi-spherical head forming a bearing surface and a boss extending from said head forming a shoulder therewith, and a sealing element clamped between the body and the head when the boss is inserted in the aperture of the body, said sealing element having a greater diameter than that of the head to extend therebeyond to seal a socket which receives the head.

16. In a bearing construction, a body having an aperture therein, a ball study having a semi-spherical head forming a bearing surface and a boss extending from said head forming a shoulder therewith, the end of said body having a shoulder, and an O-ring clamped within the body shoulder by said head when the boss is disposed in the aperture.

17. In a bearing construction, a body having an aperture therein, a ball stud having a semi-spherical head forming a bearing surface and a boss extending from said head forming a shoulder therewith, the end of said body having a shoulder, an O-ring clamped within the body shoulder by said head when the boss is disposed in the aperture, and an annular ring secured to the inner surface of the O-ring of a size to mate with the wall of said body shoulder.

18. In a kingpin assembly, a supporting member having oppositely disposed flanges containing aligned apertures of different diameters, sockets for said apertures, one of which is shouldered to extend within the smaller aperture, a kingpin having ball ends on opposite ends of a body, and means for securing said ball ends within the sockets for pivotal movement therein.

19. In a kingpin assembly, a supporting member having oppositely disposed flanges containing aligned apertures of different diameters, sockets for said apertures, one of which is shouldered to extend wthin the smaller aperture, a kingpin having ball ends on opposite ends of a body, means for securing said ball ends within the sockets for pivotal movement therein, and sealing means between the ball ends and the body in position to engage the adjacent faces of the sockets.

20. In a kingpin assembly, a supporting member having oppositely disposed flanges containing aligned apertures of different diameters, sockets for said apertures, one of which is shouldered to extend within the smaller aperture, a kingpin having ball ends on opposite ends of a body, means for securing said ball ends within the sockets for pivotal movement therein, said body having a steering arm thereon, and adjustable means on the supporting member for limiting the rearward angular movement of the steering arm.

21. In a kingpin assembly, a supporting member having oppositely disposed flanges containing aligned apertures of different diameters, sockets for said apertures, one of which is shouldered to extend within the smaller aperture, a kingpin having ball ends on opposite ends of a body, means for securing said ball ends within the sockets for pivotal movement therein, and a U-shaped bracing element extending between the flanges and secured relative thereto for resisting the movement of the flanges when a pressure is applied therebetween.

22. A kingpin assembly adapted to be received in a supporting member and including a body, a ball end on the ends of said body, a pair of sockets separable from said ball ends and from said supporting member and having a truncated spherical recess for engaging each of said ball ends, and means for clamping said sockets and said ball ends together.

(References on following page)

References Cited by the Examiner

UNITED STATES PATENTS

| | | | |
|---|---|---|---|
| 845,106 | 2/1907 | Maxim. | |
| 885,111 | 4/1908 | Vollmer | 280—96.1 |
| 1,371,594 | 3/1921 | Alden | 280—96.1 |
| 1,396,324 | 11/1921 | Gieseke | 280—96.1 |
| 1,483,282 | 2/1924 | Coston | 280—96.1 |
| 1,704,140 | 3/1929 | Moss | 280—96.1 |
| 1,873,447 | 8/1932 | McCray. | |
| 1,977,450 | 10/1934 | Mitchell | 287—89 X |
| 2,167,984 | 8/1939 | Leighton | 280—96.2 |
| 2,449,306 | 9/1948 | Leighton | 280—96.1 |
| 2,719,727 | 10/1955 | Witwer | 280—103 |
| 2,838,331 | 6/1958 | Coleman | 287—100 |
| 2,866,650 | 12/1958 | Holmstrom | 280—96.3 |
| 2,885,248 | 5/1959 | White. | |
| 2,916,295 | 12/1959 | Sandberg | 280—96.1 |
| 2,936,188 | 5/1960 | Moskovitz | 280—96.2 |
| 3,008,727 | 11/1961 | Akutowicz | 280—95 |
| 3,160,422 | 12/1964 | Enegren | 280—95 |

FOREIGN PATENTS

| | | |
|---|---|---|
| 520,442 | 2/1921 | France. |

KENNETH H. BETTS, *Primary Examiner.*

UNITED STATES PATENT OFFICE
CERTIFICATE OF CORRECTION

Patent No. 3,288,485 November 29, 1966

Charles S. White et al.

It is hereby certified that error appears in the above numbered patent requiring correction and that the said Letters Patent should read as corrected below.

Column 1, line 26, for "kingpins" read -- kingpin --; column 2, line 49, for "invention therein" read -- invention mounted therein --; column 6, line 65, before "outwardly" insert -- extending --; column 7, line 66, after "on" insert -- the ends of --; column 8, lines 7 and 16, for "study", each occurrence, read -- stud --.

Signed and sealed this 12th day of September 1967.

(SEAL)
Attest:

ERNEST W. SWIDER
Attesting Officer

EDWARD J. BRENNER
Commissioner of Patents